(12) United States Patent
Shever et al.

(10) Patent No.: US 11,794,195 B2
(45) Date of Patent: Oct. 24, 2023

(54) SYSTEM AND PROCESS FOR REMOVING PARTICULATE FROM A COAL FIRED POWER WASTE STREAM

(71) Applicants: Kent Shever, Hickory, NC (US); Kevin McDonough, Highland Park, IL (US); Kevin Matyas, Lindenhurst, IL (US); Saurabh Rastogi, Green Oaks, IL (US); David Donkin, New Waterford, OH (US); Bernard Evans, Milwaukee, WI (US)

(72) Inventors: Kent Shever, Hickory, NC (US); Kevin McDonough, Highland Park, IL (US); Kevin Matyas, Lindenhurst, IL (US); Saurabh Rastogi, Green Oaks, IL (US); David Donkin, New Waterford, OH (US); Bernard Evans, Milwaukee, WI (US)

(73) Assignee: United Conveyor Corporation, Waukegan, IL (US)

( * ) Notice: Subject to any disclaimer, the term of this patent is extended or adjusted under 35 U.S.C. 154(b) by 336 days.

(21) Appl. No.: 17/036,782

(22) Filed: Sep. 29, 2020

(65) Prior Publication Data

US 2022/0097078 A1 Mar. 31, 2022

(51) Int. Cl.
*B03B 9/00* (2006.01)
*B01D 29/00* (2006.01)
*B03B 9/06* (2006.01)

(52) U.S. Cl.
CPC .......... *B03B 9/005* (2013.01); *B01D 29/0018* (2013.01); *B03B 9/061* (2013.01)

(58) Field of Classification Search
CPC ..... B03B 9/005; B03B 9/061; B01D 29/0018; B01D 21/0045; B01D 21/01; B01D 21/2455; B01D 21/30; B01D 33/04; C02F 9/00; C02F 1/001; C02F 1/52; C02F 1/66; C02F 11/122; C02F 11/123; C02F 2001/007
See application file for complete search history.

(56) References Cited

U.S. PATENT DOCUMENTS

| | | | |
|---|---|---|---|
| 7,258,800 B1* | 8/2007 | Herbst | C02F 1/463 210/418 |
| 2010/0230830 A1* | 9/2010 | Farsad | B01D 53/78 261/111 |
| 2011/0226194 A1* | 9/2011 | Mooney | F23J 1/02 122/396 |
| 2012/0211421 A1* | 8/2012 | Self | B01D 61/025 210/205 |
| 2017/0065908 A1* | 3/2017 | Charhut | B01D 21/0045 |

* cited by examiner

*Primary Examiner* — Michael McCullough
*Assistant Examiner* — Kalyanavenkateshware Kumar
(74) *Attorney, Agent, or Firm* — Vitale Vickrey Niro & Gasey

(57) ABSTRACT

A system and process for closed loop system for removing particulate from a coal fired power wash water waste stream comprising a submerged flight conveyor for receiving used wash water, a bleed line for diverting wash water from the submerged flight conveyor, a filter for removing particulate from the diverter wash water, and pumps to recirculate the wash water on a loop through the system.

6 Claims, 2 Drawing Sheets

SYSTEM AND PROCESS FOR REMOVING PARTICULATE FROM A COAL FIRED POWER WASTE STREAM

FIELD OF THE INVENTION

The present disclosure is directed towards a system and method for removing particulate from a coal fired power waste stream. More specifically, the present disclosure is directed towards a system used to treat a wash stream in a coal fired boiler including use of a bleed line for a submerged flight conveyor downstream of a boiler output, a filter connected to the bleed line for removing particulate from the wash stream output, and a return line for returning the filtered wash water to the wash water inlet proximate the boiler.

BACKGROUND OF THE DISCLOSURE

The present disclosure relates to a cleaning system for removing hazardous particulate from a coal tired boiler using, for example, a precipitator or air heater wash/cleaning cycle during a plant outage. The coal used to provide an energy source for a steam boiler contains varying quantities of mineral matter which, when the coal is burned, results in creation of the combustible residue known as ash. As is known, two types of ash result from operation of solid fuel-fired boilers, namely, bottom ash and fly ash. Bottom ash is slag that builds up on the heat absorbing surfaces of a furnace and that eventually falls by its own weight or as a result of load changes or the blowing of soot. Fly ash is finer, and as such, leaves the boiler suspended in the flue gas and is collected in various hoppers due to mechanical fall out, such as Economizer, Air-Heater, Selective Catalytic Reduction, and Precipitator or Baghouse Hoppers.

In such systems, regular practice during utility outages and other coal fired power plants entails a water washdown of hoppers, vertical walls and other components, including the boiler, the air pre-heater, the precipitator and the economizer. That is, the components used with such systems need to be taken off-line periodically and washed to remove ash and other particulate that has caked onto the system. In addition to the particulate caked onto the previously described surfaces, large quantities of iron oxide rust particles are removed with the cake, along with sulfur containing residues deposited during flue gas condensation.

Historically, contaminated wash water was directed to surface impoundments, or "ash ponds," for settling. However, with changes in environmental regulations, nearly all existing ash ponds will be taken out of service. Wash water during such outages will need to be treated for compliance with regulatory discharge limitations. For example, such water may have limitations on suspended solids e.g., ≤30 mg/L monthly average, with a ≤100 mg/L daily max), metal content (e.g., ≤30 mg/L), and/or pH (e.g., a range of 6-9). In other words, it is critical to ensure that the water and solids/contaminants are separated from one another after a wash cycle. The separation becomes more complicated due to the labor-intensive nature of the washdown process. One to six maintenance workers, using hoses, will be spraying surfaces with high pressure water, so the volume of the wastewater stream and the concentration of contaminants in the stream are highly variable.

In order to comply with the need for controlling and treating wash water, some operators will procure and install a separate outage wash water treatment system. Such a system can entail millions of dollars in capital cost or more, while only providing a system that is idle for most of the year. In addition, such system can create a multitude of maintenance headaches to ensure that the cleaning system works on the infrequent occasions when it is employed. An alternative approach is for plant operators to contract for a temporary, mobile treatment system. Complying with effluent discharge requirements is a challenge in such temporary systems, especially insofar as plant operators may be unfamiliar with such contracted equipment, and this equipment, needing to be rented to as many liquid-solid separation applications as feasible, is too generic in nature to work in such a difficult and specialized application. Several attempts at employing temporary equipment solutions have failed to achieve desired results due to the variability of the effluent stream, emphasizing the complicated nature of the solid liquid separation problem.

Existing wastewater treatment system use multiple tanks for flow equalization. pH adjustment, and chemical additions for metal precipitation. Such systems can further include large diameter clarifiers for solids settling. In addition, such existing systems may further include a belt press to dewater the clarifier and sludge holding tank underflow streams and bag filters to polish the effluent of the clarifiers to guarantee the water made the effluent quality requirements.

Such existing approaches, however, have certain limitations in their use during outage wash cycles. The use and setup of the fixed diameter tanks designed for constant or narrow inlet flow variations cannot handle the change in flow from one wash hose operating to six operating. At lower flows, solids which normally do not settle out in equalization tanks for pH adjustment tanks now settle out and these tanks have no means to remove these settle solids. In other words, these treatment tanks act as clarifiers and plug up. Once larger flows are reestablished these plugged up tanks can overflow allowing untreated water to spill on the ground. If they do not overflow, the smaller tank volume due to sludge accumulation reduces the necessary buffering times to allow for proper chemical mixing. Additionally, the measurement device and control loops for pH, coagulant, and flocculant adjustment are constantly adjusting, not able to stay ahead of flow variations resulting in too much or too little dosing, thereby failing to meet the regulatory discharge limits. Solids type, fly ash or metals, vary significantly depending on the area being manually hosed during the wash. Often the concentration and density are so low the resultant slurry cannot be dewatered using conventional filter presses, necessitating extensive capacity or residence time for thickening.

Thus, there is a need to provide a reliable system and method for removing suspended particulate and dissolved solids from a coal fired power waste stream.

In addition, there is a need to provide a for a wash stream process in a coal fired boiler to ensure that untreated wash water does not spill out of the system.

Further, there is a need to provide a simpler method to remove particulate from a coal fired power waste stream.

In addition, there is a need to provide a system that leverages existing plaint technology such that plant operators can more readily control the treatment of wash water during an outage cycle.

Finally, there is a need to provide a flexible systems untreated water to spill out of the system that can be used portably, with existing plant configurations, or on a permanent basis as desired.

Definition of Terms

The following terms are used in the claims of the patent as filed and are intended to have their broadest plain and ordinary meaning consistent with the requirements of the law.

SFC or Submerged Flight Conveyor—a mechanical ash transporter that removes wet ash/material along at least a section of the Submerged Flight Conveyor, typically by using chain-driven flights so that ash or any settled solid is continuously removed the flights move through the a generally horizontal trough portion and then an incline portion.

Where alternative meanings are possible, the broadest meaning is intended. All words used in the claims set forth below are intended to be used in the normal, customary usage of grammar and the English language.

OBJECTS AND SUMMARY OF THE DISCLOSURE

The present disclosure solves existing needs for an improved flow, concentration, and pH flexible system and method for removing particulate from a coal fired power waste stream. To prevent an issue like the uncontrolled release of untreated wash water, the present disclosure entails processing wash water flow to a single large body of water like a remote SFC which has a large volume buffering capacity.

In a first embodiment, the present disclosure entails a permanent outage wash wastewater system that will leverage to the existing structure from a Bottom Ash Dewatering (BADW) System. The permanent outage (i.e., offline) wash wastewater system will be designed to handle the wastewater from the boiler and/or other related equipment (e.g., a precipitator, and air preheater) washdown during an outage. These washdown flows are collected in the existing ash collection tanks, bottom ash hoppers, or plant sumps and conveyed to the BADW via pumps. In this embodiment, the disclosure envisions adding to the existing dewatering system with a pre-treatment system at the existing ash collection tanks, using caustic and coagulant injection skids, to treat the outage wash wastewater upstream of the existing BADW. The outage wash wastewater will be routed to a standby submerged flight conveyor (SFC) dewatering train (e.g., one of a plurality of SFC dewatering trains in the system). The volume of sludge will be inventoried primarily in the standby SFC. The sludge bed formed in the SFC will be pumped to tanks and a press for further processing and discharge to further transport, e.g., trucks.

Since outage wash introduces additional flows from outside the BADW recirculation system via freshwater hoses/headers/nozzles, the existing bottom ash dewatering system recirculation water tank will be modified to divert treated water in excess of the demand of the recirculation pumps to a clean water channel. The system would thus include a bleed line or drain to remove the treated water, preferably through a pump and filter, which would then feed back to the wash nozzles for the boiler and other equipment. The system thus—at least in terms of the volume of wash water being used—is a closed loop system. The system may further include a pH Control skid to adjust the pH of the water in the recirculation tank prior to discharging to the clean water channel.

A second preferred embodiment of the present disclosure is similar in scope to the first embodiment, save for its role as a portable wash wastewater remediation system. With the short remaining life of the certain plants and/or infrequent outage wash schedules, (e.g., once a year). this embodiment could provide an economical alternative to the permanent outage wash system described above. This system would thus use temporary equipment that can be rented and brought onsite during each outage, while still using a majority of existing plant equipment to improve ease of use by the plant operator. Such an alternative approach would similarly entail feed and water supply pumps to remove wash water being diverted in the trough portion of an SFC dewatering train for filtering (e.g., through a bag filter or belt filter) for removal and reuse.

Thus, one object of the present invention is to provide a system and method for removing particulate from a coal fired power waste stream.

A further object of the present invention to provide a closed loop system during a wash stream process of a coal fired boiler to ensure that untreated wash water does not spill out of the system.

Yet another object of the present invention is to process wash water flow with a single large body of water like an SFC which has a large volume buffering capacity.

Finally, an object of the present invention is to provide a flexible system for treating wash water in a coal tired system portably, with existing plant configurations, or on a permanent basis as desired.

It will be understood that not every claim will employ each and every object as set forth above in the operation of the present invention. However, these and other objects, advantages and features of the invention will be apparent from the following description of the preferred embodiments, considered along with the accompanying drawings.

DETAILED DESCRIPTION OF THE INVENTION

Set forth below is a description of what is currently believed to be the preferred embodiment or best examples of the invention claimed. Future and present alternatives and modifications to this preferred embodiment are contemplated. Any alternatives or modifications which make insubstantial changes in function, in purpose, in structure or in result are intended to be covered by the claims in this patent.

Figure 1:
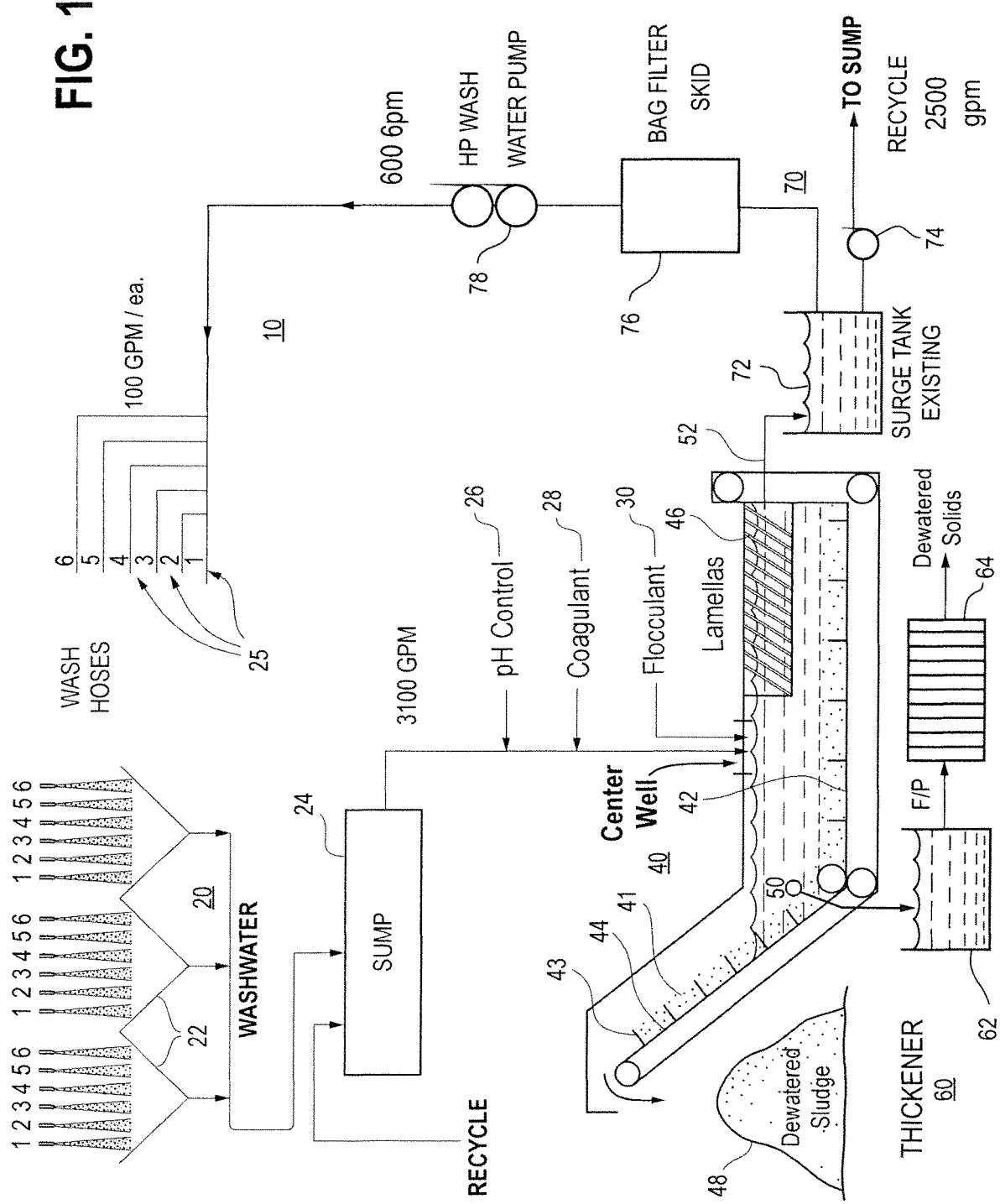
FIG. 1 shows a schematic of a system using the components of a first wash system embodiment of the present disclosure.
Figure 2:
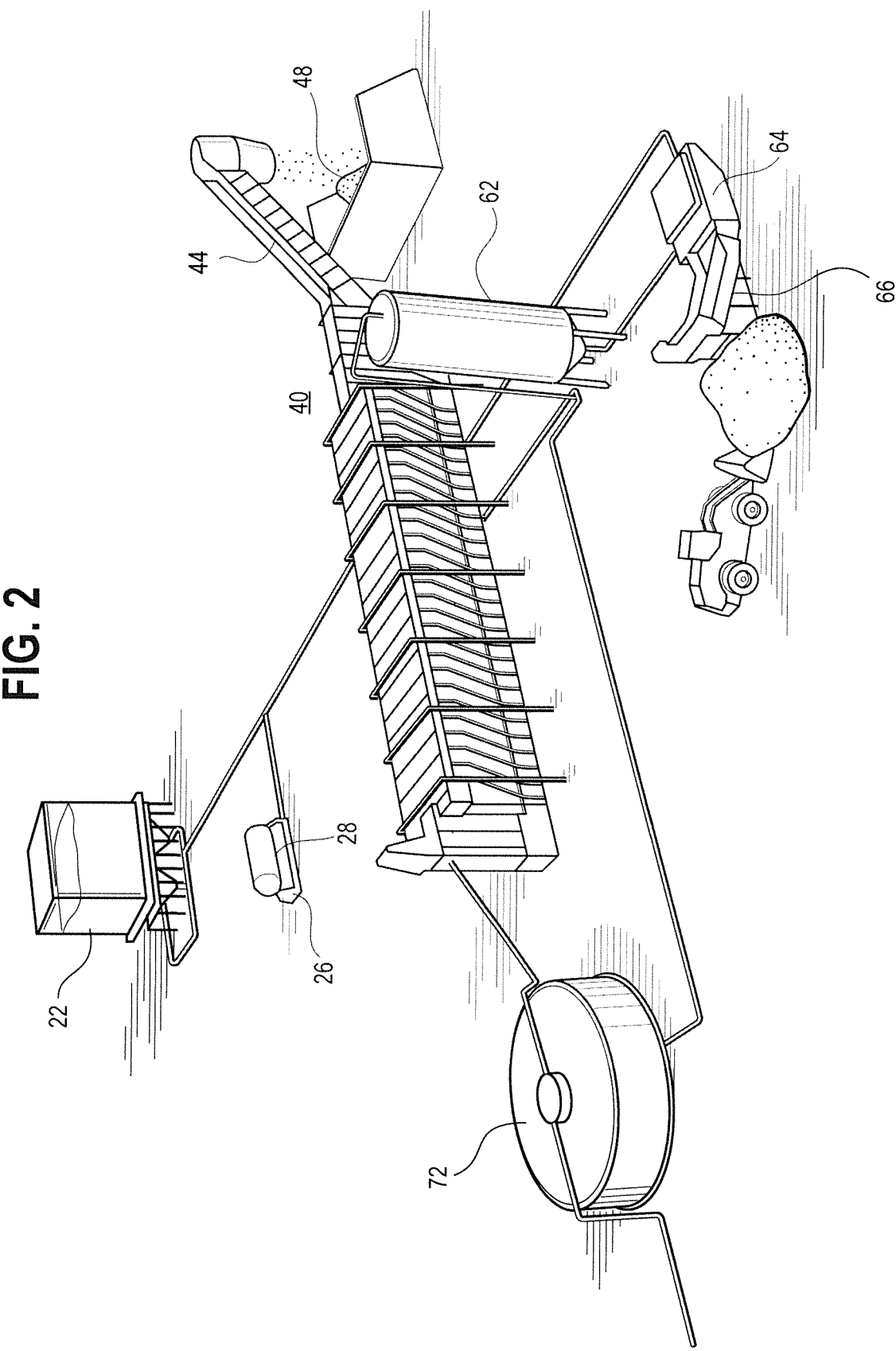
FIG. 2 is a perspective view of an alternative embodiment of the present disclosure.

FIGS. 1 and 2 show a bottom ash wash water processing system 10 in accord with embodiments of the present invention. The main components of a coal fired plant that are leveraged by the present disclosure are hopper wash treatment subsystem 20, submerged flight conveyor subsystem 40, clarifier/thickener subsystem 60, and surge tank subsystem 70.

The wash treatment subsystem 20 is generally comprised of one or more hoppers 22 which each drain into a sump 24 for subsequent processing. The wash water involved in the wash treatment subsystem 20 is preferably supplied by one or more wash hoses 25. For purposes of this embodiment, the system includes six wash hoses, each of which provides a water at a rate of 100 gallons per minute each (i.e., for a total wash hose wash water supply rate of 600 gallons per minute). To this flow is added a flow rate of recycled surge tank water (as explained further below) which, in this example is provided in a flow rate of 2500 gallons per minute. These two flows are combined within the sump 24 and sent to the submerged flight conveyor subsystem 40 which, in this example is provided at a flow rate of 3100 gallons per minute. Larger flow rates such as these are preferable in order to leverage existing large pipe diameters to provide minimum flow velocities to prevent the settling of suspended solids. For instance, a 2500 to 3100 gallons per minute flow rate enables a flow rate above suspension velocity for a 12-inch diameter pipe. Those of skill in the art having this teaching will understand the adjustments in pipe diameter will impact the volumetric capacity and adjust the flow rate accordingly to prevent settling. Optionally, this combined flow rate may be pretreated prior to placement in the submerged flight conveyor subsystem 40. The pretreatments can include pH control 26 and/or coagulant control 28 to raise the pH of the water to force dissolved contaminants out of the stream.

The submerged flight conveyor subsystem 40 is comprised of a conveyor chain 41 including flights 43 which traverse a substantially horizontal portion 42 and an inclined portion 44. Optionally, the submerged flight conveyor subsystem 40 has a flocculant control 30 for capturing and removing additional particulate from the water contained therein. In the preferred embodiment as provided herein, the substantially horizontal portion 42 preferably includes a series of Lamella plates 46 for filtering particulate that remains buoyant to remove the lightest particles suspended in the flow. The heaviest particulate, by contrast, is pulled by the scrappers 43 or flights of the conveyor chain 41 up the inclined portion 44 past the water line of the submerged flight conveyor subsystem 40 and is dumped into dewatered sludge pile 48. The submerged flight conveyor subsystem 40 further includes a bleed line 50, which siphons water from the submerged flight conveyor subsystem 40 for transfer to the thickener/clarifier subsystem 60. This subsystem 60 starts with a thickening tank 62 or clarifier, the particulate or settled sediment of which is transferred to filter press 64 to provide dewatered solids to be removed. A further option (as shown in FIG. 2) is a further secondary conveyor 66 which can further process and dewater the particulate output from filter press 64.

The bleed line 50 is a dewatering line, which is most preferably proximate to the joint of the inclined portion 44 and the horizontal portion. A purpose of the bleed line 50 is to capture particulate which is suspended but submerged beneath a level where such particulate would be captured by Lamella plate 46. The water thus removed the bleed line 50 is thus transferred to the thickener/clarifier subsystem 60 as described above, with water from removed from the thickening and filtering process in that subsystem being recirculated back to the submerged flight conveyor subsystem 40. The submerged flight conveyor subsystem 40 also preferably includes second bleed line 52 or overflow port for recirculation to the wash hoses 25 and/or recirculation to the sump 24 as describe herein. This second bleed line 52 is proximate the back end of the lamella plates 46, at the opposite end of the substantially horizontal section 42 of the submerged flight conveyor 40, i.e., at the opposite end from bleed line 50.

At the same time as a portion of the sub-lamella water flow is processed by the bleed line 50, another portion of the water flow in the submerged flight conveyor subsystem 40 proximate to the Lamella plates 46 will pass or overflow from the submerged flight conveyor subsystem 40 to the surge tank subsystem 70 this surge tank subsystem 70 could comprise a surge tank, a second submerged flight conveyor 72 or a different configuration as desired by the operator. The surge tank 72 provides two separate outputs. A first portion of the surge tank 72 will be output to a pump 74 where it is recirculated to sump 24. In the example of this embodiment, the amount taken through this portion is about 2500 gallons per minute in flow. The second portion of the surge tank 72 (in this instance, about 600 gallons per minute) will be removed and sent through a bag filter 76 for removing any remaining particulate, where pump 78 is used to conveyed the output of purified water from the bag filter 76 to the high pressure wash hoses 25 for reuse in cleaning the hoppers 22. The wash water thus removed from the surge tank 72 can thus be brought back to keep the wash water on a "closed loop." That is, since outage wash introduces additional flows from outside the BADW recirculation system, the existing bottom dewatering system recirculation surge tank 72 will divert treated water in excess of the demand of the recirculation pump(s) 78 to the clean water channel where the water can be sent to the sump 24 and eventually reused by the nozzles in further washing, thus creating a closed loop for the wash water.

This system can be employed as a static unit with dedicated wash water recycling components, or it can be a set of portable subsystems such as shown in FIG. 2, will all the components except for hopper(s) 22 being brought in on a periodic basis for cleaning and fly ash removal.

The above description is not intended to limit the meaning of the words used in the following claims that define the invention. For instance, it is contemplated that other types of filters may be used with wash water treatment to a desired effect. Similarly, other chemical treatments (e.g., the use of flocculants with the SFC dewatering train) may likewise add to the process of removing solids from the wash water. Rather, it is contemplated that future modifications in structure, function or result will exist that are not substantial changes and that all such insubstantial changes in what is claimed are intended to be covered by the claims.

We claim:

1. A closed loop system for removing particulate from a coal fired power waste stream comprising:
   a) at least one hopper, including wash water inlets;
   b) at least one submerged flight conveyor, including a horizontal section for receiving wash water, the horizontal section including a series of lamella plates so as to capture particulate therefrom, and an incline dewatering section adjacent to the horizontal section;
   c) a bleed line below the series of lamella plates for draining wash water from the submerged flight conveyor adjacent the joint between the horizontal and incline sections;
   d) a filter connected to the bleed line for removing particulate from the wash water; and
   e) a return pump for feeding the filtered wash water to the wash water inlets.

2. A system for processing particulate from a wash stream in a coal fired power waste stream comprising:
   a) a submerged flight conveyor including substantially horizontal section including a series of lamella plates so as to capture particulate therefrom, and an inclined section;
   b) a plurality of scrapers rotating through at least the horizontal section;
   c) a bleed line below the series of lamella plates proximate the joint between the horizontal and incline sections; and
   d) a filter connected to the bleed line for removing particulate from the coal fired power waste stream.

3. The closed loop system of claim 2 wherein the filter is a bag filter.

4. The closed loop system of claim 2 wherein at least a portion of the waste stream is dewatering by the incline section of the submerged flight conveyor.

5. The closed loop system of claim 2 wherein at least a portion of the waste stream is pretreated with at least one of a pH adjustment, coagulant and flocculent to precipitate dissolved metal therefrom.

6. A method for treating a wash water waste stream from a hopper comprising:
   a) receiving the wash water waste stream into a submerged flight conveyor, the submerged flight conveyor comprising substantially horizontal and inclined portions;
   b) treating a first portion of the wash water waste stream with a series of lamella plates so as to capture particulate therefrom;
   c) removing a second portion of the wash water waste stream from the submerged flight conveyor via a bleed line for processing in a thickening tank and filter to capture particulate therefrom;
   d) returning water removed from the second portion of the wash water waste stream in the thickening tank and filter to the submerged flight conveyor;
   e) removing an overflow portion of water from the submerged flight conveyor to a surge tank;
   f) removing a portion of the water from the surge tank to supply wash water to the wash water waste stream in the hopper;
   g) returning the remainder of the water from the surge tank to the submerged flight conveyor; and
   h) removing settled particulate from the wash water waste stream via the inclined portion of the submerged flight conveyor.

* * * * *